(12) United States Patent
Manolakos

(10) Patent No.: US 11,032,048 B2
(45) Date of Patent: Jun. 8, 2021

(54) USE-CASES AND CONSTRAINTS ON MULTIPLE SRS RESOURCE SETS FOR ANTENNA SWITCHING IN NR REL-15

(71) Applicant: QUALCOMM Incorporated, San Diego, CA (US)

(72) Inventor: Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 16/413,372

(22) Filed: May 15, 2019

(65) Prior Publication Data

US 2019/0356445 A1  Nov. 21, 2019

Related U.S. Application Data

(60) Provisional application No. 62/673,634, filed on May 18, 2018.

(51) Int. Cl.
*H04L 5/00* (2006.01)
*H04B 7/08* (2006.01)

(52) U.S. Cl.
CPC ......... *H04L 5/0051* (2013.01); *H04B 7/0805* (2013.01)

(58) Field of Classification Search
CPC .......................... H04L 5/0051; H04B 7/0805
See application file for complete search history.

(56) References Cited

U.S. PATENT DOCUMENTS 9,503,231 B2 * 11/2016 Gaal .................. H04L 5/0048
2011/0058505 A1 * 3/2011 Pan ................... H04J 11/005
370/280

(Continued)

OTHER PUBLICATIONS

AD-HOC Chair (Samsung): "Chairman's notes of AI 7.1.2 MIMO", 3GPP Draft; R1-1807785, 3rd Generation Partnership Project (3GPP), Mobile Competence Centre ; 650, Route Des Lucioles, France, vol. RAN WG1, No. Busant Korea; May 21, 2018-May 25, 2018 May 29, 2018, XP051463495, Retrieved from the Internet: URL:http://www.3gpp.org/ftp/tsg%5Fran/WG1%5FRL1/TSGR1%5F93/Docs [retrieved on May 29, 2018], 32 pages.

(Continued)

*Primary Examiner* — Fahmida S Chowdhury
(74) *Attorney, Agent, or Firm* — Norton Rose Fulbright LLP

(57) ABSTRACT

In an aspect, a method of wireless communication includes transmitting a configuration message, by a base station to a user equipment (UE), that configures the UE, according to one or more antenna switching constraints, with multiple sounding reference signal (SRS) resource sets for antenna switching by the UE. The method also includes receiving one or more SRS, by the base station, transmitted by the UE according to the configuration of the multiple SRS resource sets. In another aspect, a method of wireless communication includes receiving a configuration message, by a user equipment (UE) from a base station, that configures the UE, according to one or more antenna switching constraints, with multiple sounding reference signal (SRS) resource sets for antenna switching by the UE. The method also includes transmitting one or more SRS, by the UE to the base station, according to the configuration of the multiple SRS resource sets.

55 Claims, 13 Drawing Sheets

(56) References Cited

U.S. PATENT DOCUMENTS

| | | | | |
|---|---|---|---|---|
| 2012/0300740 A1* | 11/2012 | Iwai | ................... | H04J 13/0062 |
| | | | | 370/329 |
| 2018/0167129 A1* | 6/2018 | Aiba | ....................... | H04B 7/08 |
| 2019/0349964 A1* | 11/2019 | Liou | ................. | H04W 72/1284 |
| 2020/0204316 A1* | 6/2020 | Zhang | ................... | H04L 5/0051 |
| 2020/0252241 A1* | 8/2020 | Park | ................... | H04L 25/0226 |

OTHER PUBLICATIONS

Ericsson: "Remaining Issues on SRS", 3GPP Draft; R1-1806227 Remaining Issues on SRS, 3rd Generation Partnership Project (3GPP), Mobile Competence Centre ; 650, Route Des Lucioles, France, vol. RAN WG1, No. Busant Korea; May 21, 2018-May 25, 2018 May 12, 2018, XP051462395, Retrieved from the Internet: URL:http://www.3gpp.org/ftp/tsg%5Fran/WG1%5FRL1/TSGR1%5F93/Docs [retrieved on May 12, 2018], 3 pages.

Huawei et al., "Remaining Details of SRS Design", 3GPP Draft; R1-1805959, 3rd Generation Partnership Project (3GPP), Mobile Competence Centre ; 650, Route Des Lucioles, vol. RAN WG1, No. Busan, Korea; May 21, 2018-May 25, 2018, May 11, 2018, XP051461667, Retrieved from the Internet: URL:http://www.3gpp.org/ftp/tsg%5Fran/WG1%5FRL1/TSGR1%5F93/Docs [retrieved on May 11, 2018], 5 pages.

International Search Report and Written Opinion—PCT/US2019/032647—ISA/EPO—dated Aug. 27, 2019.

* cited by examiner

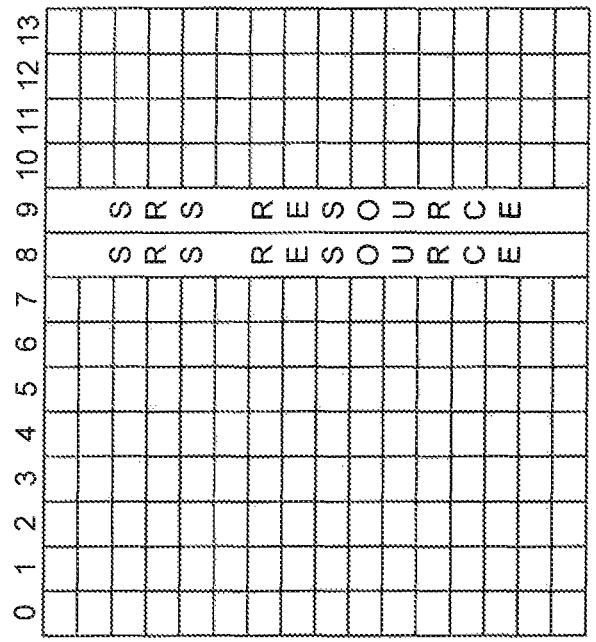
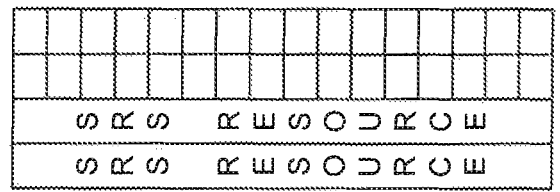
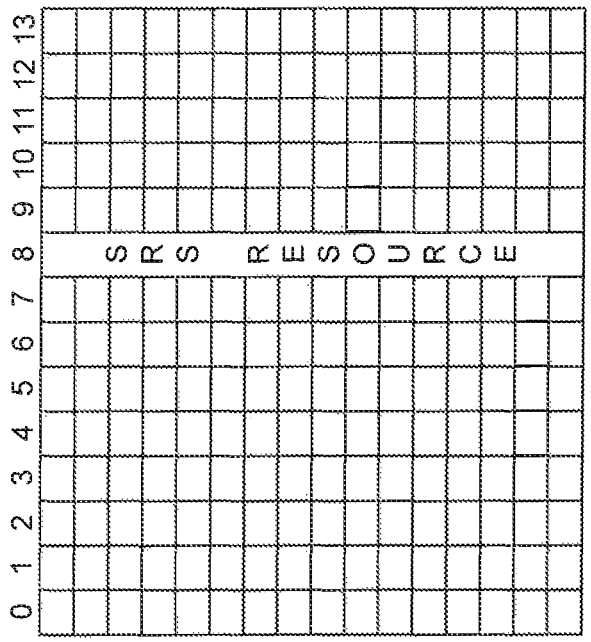
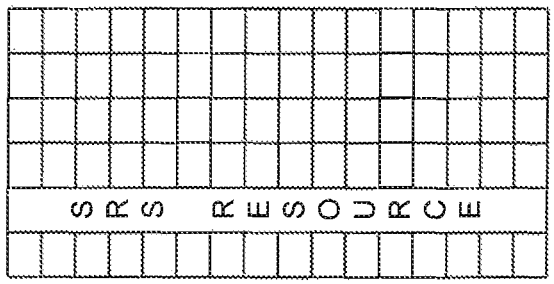
FIG. 3B

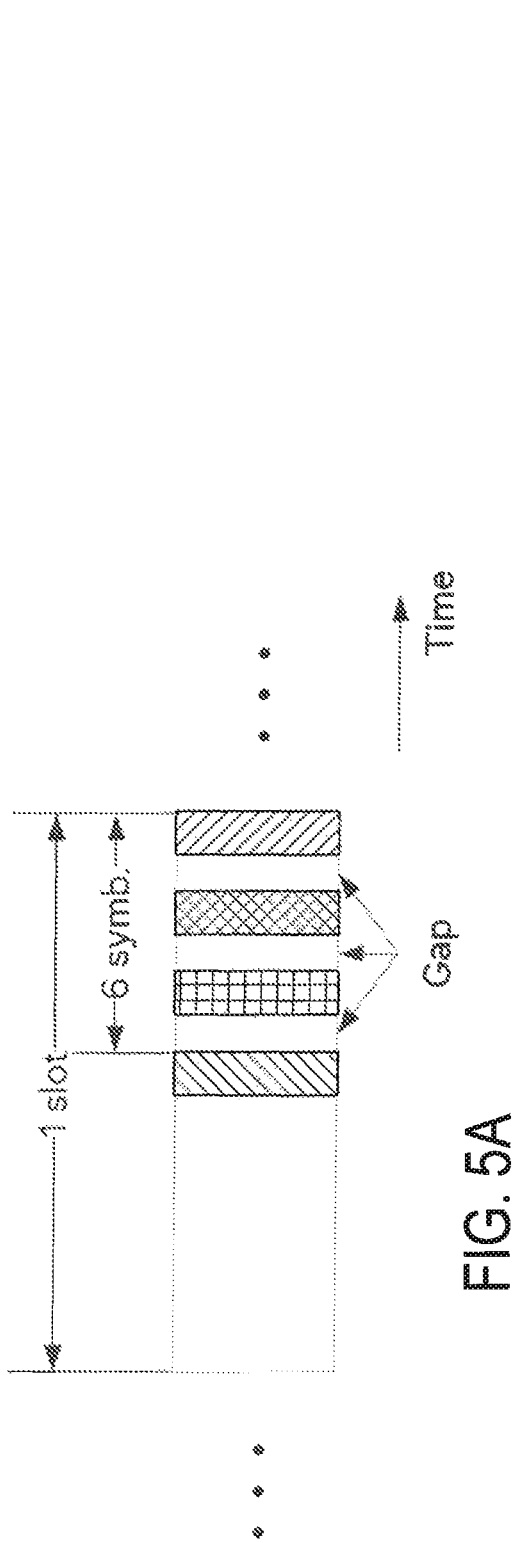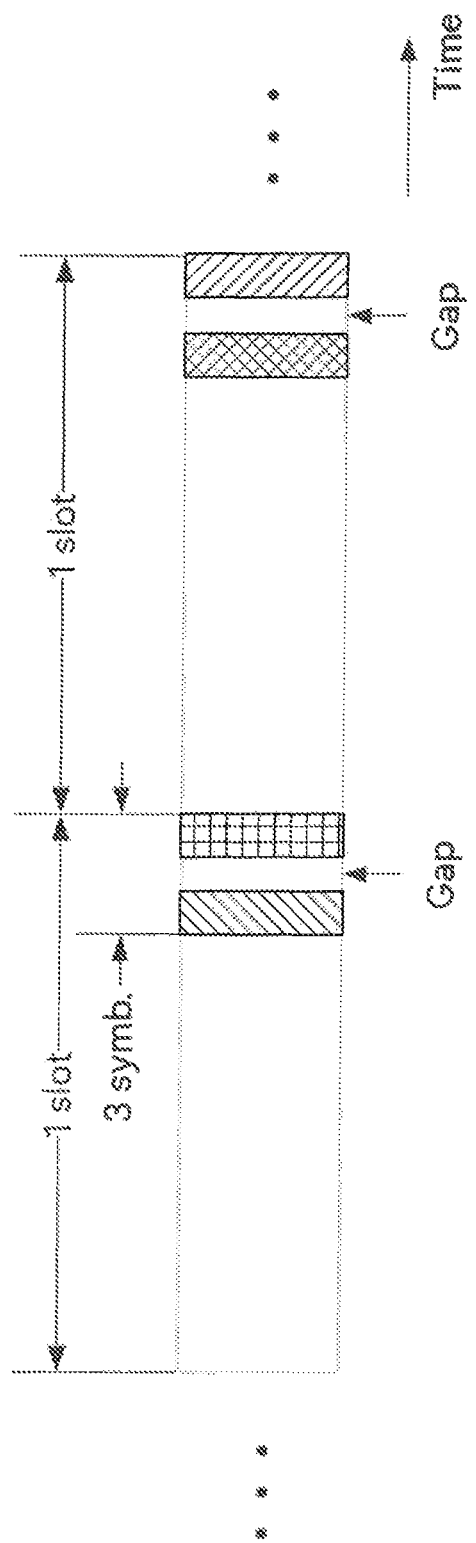
FIG. 5A
FIG. 5B

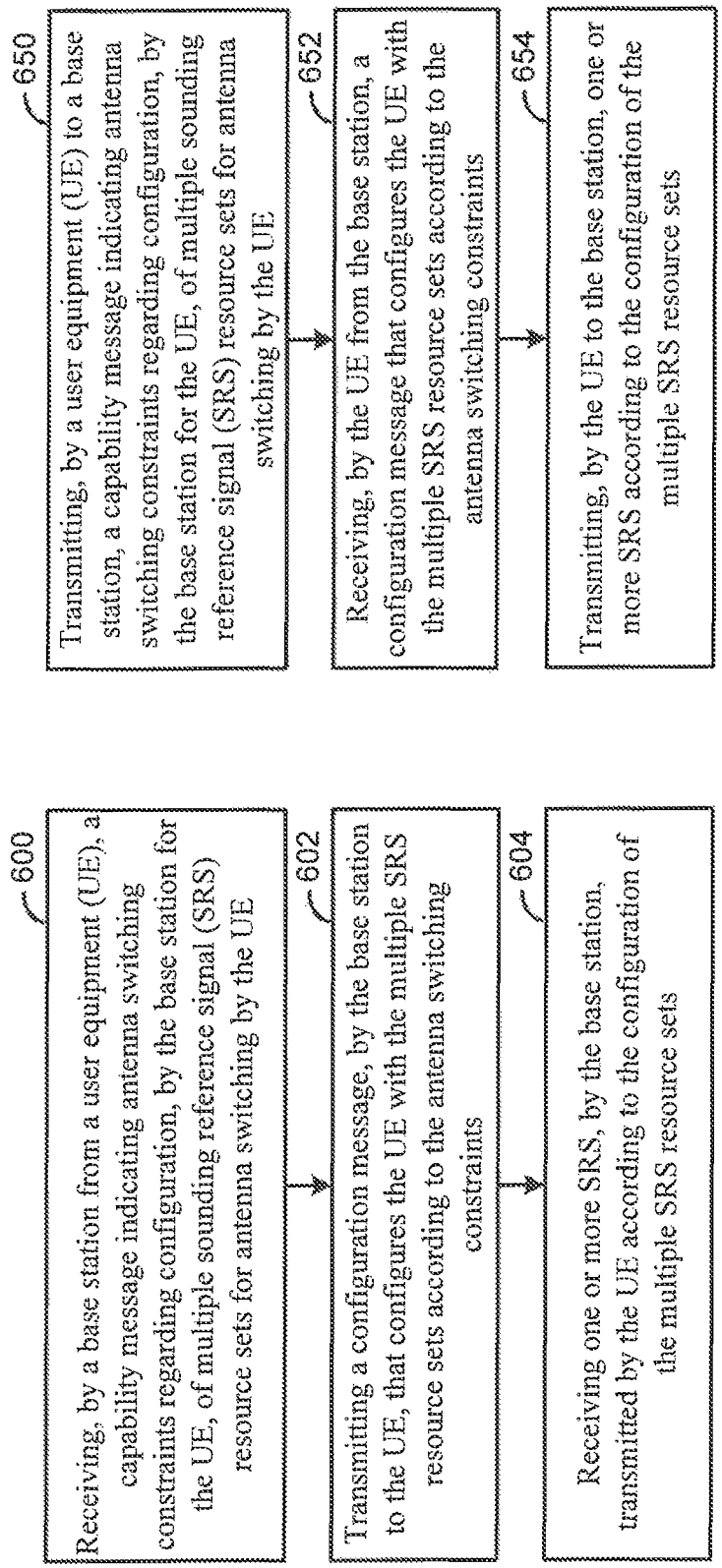

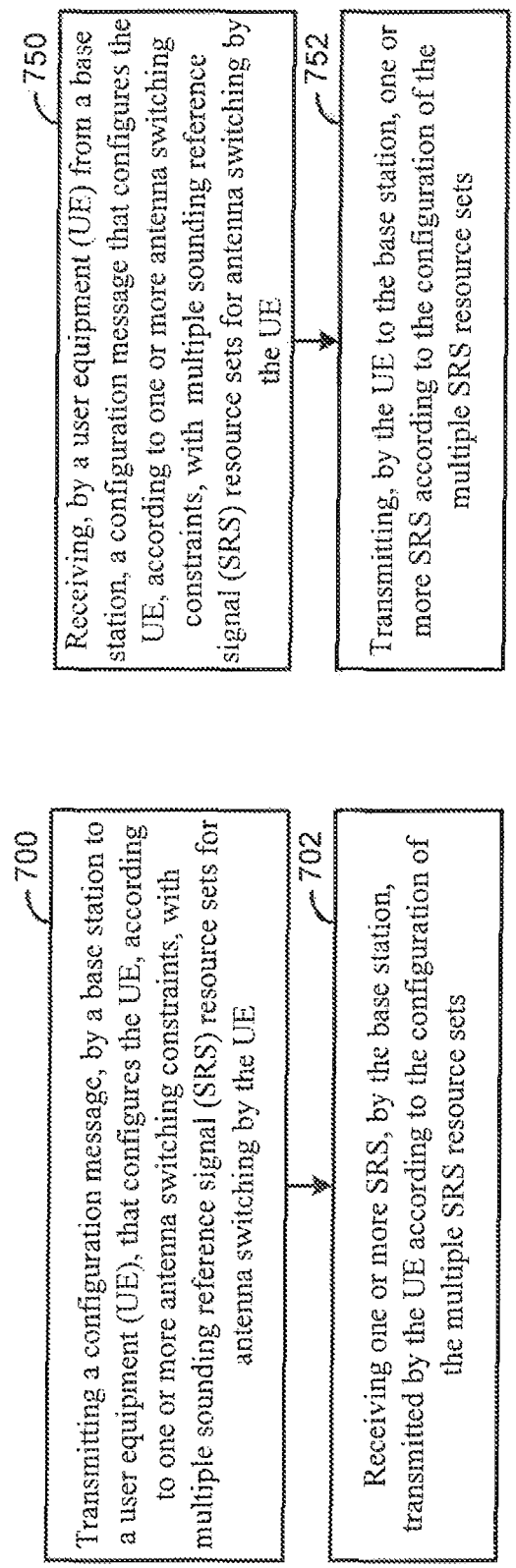

USE-CASES AND CONSTRAINTS ON MULTIPLE SRS RESOURCE SETS FOR ANTENNA SWITCHING IN NR REL-15

CROSS-REFERENCE TO RELATED APPLICATIONS

The present application claims the benefit of U.S. Provisional Patent Application No. 62/673,634, filed on May 18, 2018, the disclosure of which is incorporated herein by reference in its entirety.

TECHNICAL FIELD

Aspects of the present disclosure relate generally to wireless communication systems, and more particularly, to constraints for multiple SRS resource sets for antenna switching.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

Recently, attention is being given to UE antenna selection for uplink (UL) multiple input/multiple output (MIMO) and sounding reference signal (SRS) in New Radio (NR). In long term evolution (LTE), a UE may have asymmetric transmit (TX)/receive (RX) chains to reduce cost and/or power consumption. Downlink (DL) transmission uses a higher data rate, so a UE supports DL MIMO by having multiple receive chains at the UE (e.g., 4 RX). UL transmission uses a comparatively lower data rate, so a UE may not need to support UL MIMO, which means that a single transmit chain may be implemented at the UE.

For reciprocity based DL MIMO, SRS TX switching is used in case of asymmetric TX/RX. In time division duplexing (TDD), the gNB may determine the DL MIMO precoding from an UL channel estimation based on SRS transmitted by the UE. In case of asymmetric TX/RX, all RX antennas can be sounded by connecting to the TX in a time-division multiplexing (TDM) manner, also known as SRS TX switching.

The LTE SRS TX switching solution cannot be applied to NR directly. For example, in LTE such switching is only supported when. UL MIMO is not configured. Considering only the 1TX/2RX case, a simple solution might involve alternating TX antennas. However, in NR, the typical setup could be 1TX/4RX or 2TX/4RX SRS resource set configuration. Accordingly, attention is being given to how SRS TX switching will interact with UL MIMO, wider band operation, and/or multiple SRS resources.

BRIEF SUMMARY OF SOME EMBODIMENTS

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect, a method of wireless communication includes transmitting a configuration message, by a base station to a user equipment (UE), that configures the UE, according to one or more antenna switching constraints, with multiple sounding reference signal (SRS) resource sets for antenna switching by the UE. The method also includes receiving one or more SRS, by the base station, transmitted by the UE according to the configuration of the multiple SRS resource sets.

In another aspect, a method of wireless communication includes receiving a configuration message, by a user equipment (UE) from a base station, that configures the UE, according to one or more antenna switching constraints, with multiple sounding reference signal (SRS) resource sets for antenna switching by the UE. The method also includes transmitting one or more SRS, by the UE to the base station, according to the configuration of the multiple SRS resource sets.

In another aspect, an apparatus for wireless communication has means for transmitting a configuration message, by a base station to a user equipment (UE), that configures the UE, according to one or more antenna switching constraints, with multiple sounding reference signal (SRS) resource sets for antenna switching by the UE. The apparatus also has means for receiving one or more SRS, by the base station, transmitted by the UE according to the configuration of the multiple SRS resource sets.

In another aspect, an apparatus for wireless communication has means for receiving a configuration message, by a user equipment (UE) from a base station, that configures the UE, according to one or more antenna switching constraints, with multiple sounding reference signal (SRS) resource sets for antenna switching by the UE. The apparatus also has means for transmitting one or more SRS, by the UE to the base station, according to the configuration of the multiple SRS resource sets.

In another aspect, an apparatus for wireless communication has at least one computer processor and at least one memory coupled to the at least one computer processor. The at least one computer processor is configured to transmit a configuration message, by a base station to a user equipment (UE), that configures the UE, according to one or more antenna switching constraints, with multiple sounding reference signal (SRS) resource sets for antenna switching by the UE. The at least one computer processor is also configured to receive one or more SRS, by the base station, transmitted by the UE according to the configuration of the multiple SRS resource sets.

In another aspect, an apparatus for wireless communication has at least one computer processor and at least one memory coupled to the at least one computer processor. The at least one computer processor is configured to receive a configuration message, by a user equipment (UE) from a base station, that configures the UE, according to one or more antenna switching constraints, with multiple sounding reference signal (SRS) resource sets for antenna switching by the UE. The at least one computer processor is also configured to transmit one or more SRS, by the UE to the base station, according to the configuration of the multiple SRS resource sets.

In another aspect, a non-transitory computer-readable medium has instructions recorded thereon that, when enacted by one or more computer processors, cause the one or more computer processors to transmit a configuration message, by a base station to a user equipment (UE), that configures the UE, according to one or more antenna switching constraints, with multiple sounding reference signal (SRS) resource sets for antenna switching by the UE. The instructions also cause the one or more computer processors to receive one or more SRS, by the base station, transmitted by the UE according to the configuration of the multiple SRS resource sets.

In another aspect, a non-transitory computer-readable medium has instructions recorded thereon that, when enacted by one or more computer processors, cause the one or more computer processors to receive a configuration message, by a user equipment (UE) from a base station, that configures the UE, according to one or more antenna switching constraints, with multiple sounding reference signal (SRS) resource sets for antenna switching by the UE. The instructions also cause the one or more computer processors to transmit one or more SRS, by the UE to the base station, according to the configuration of the multiple SRS resource sets.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3B is a block diagram illustrating SRS resources with intra-slot frequency hopping according to some embodiments of the present disclosure.

FIG. 5A is a block diagram illustrating intra-slot SRS UE antenna switching for a 1T4R resource set according to some embodiments of the present disclosure.

FIG. 5B is a block diagram illustrating inter-slot SRS UE antenna switching for a 1T4R resource set according to some embodiments of the present disclosure.

FIG. 6A is a block diagram illustrating example blocks of a wireless communication procedure carried out by a base station configured according to some embodiments of the present disclosure.

FIG. 6B is a block diagram illustrating example blocks of a wireless communication procedure carried out by a user equipment (UE) configured according to some embodiments of the present disclosure.

FIG. 7A is a block diagram illustrating example blocks of a wireless communication procedure carried out by a base station configured according to some embodiments of the present disclosure.

FIG. 7B is a block diagram illustrating example blocks of a wireless communication procedure carried out by a user equipment (UE) configured according to some embodiments of the present disclosure.

DETAILED DESCRIPTION

Figure 1:
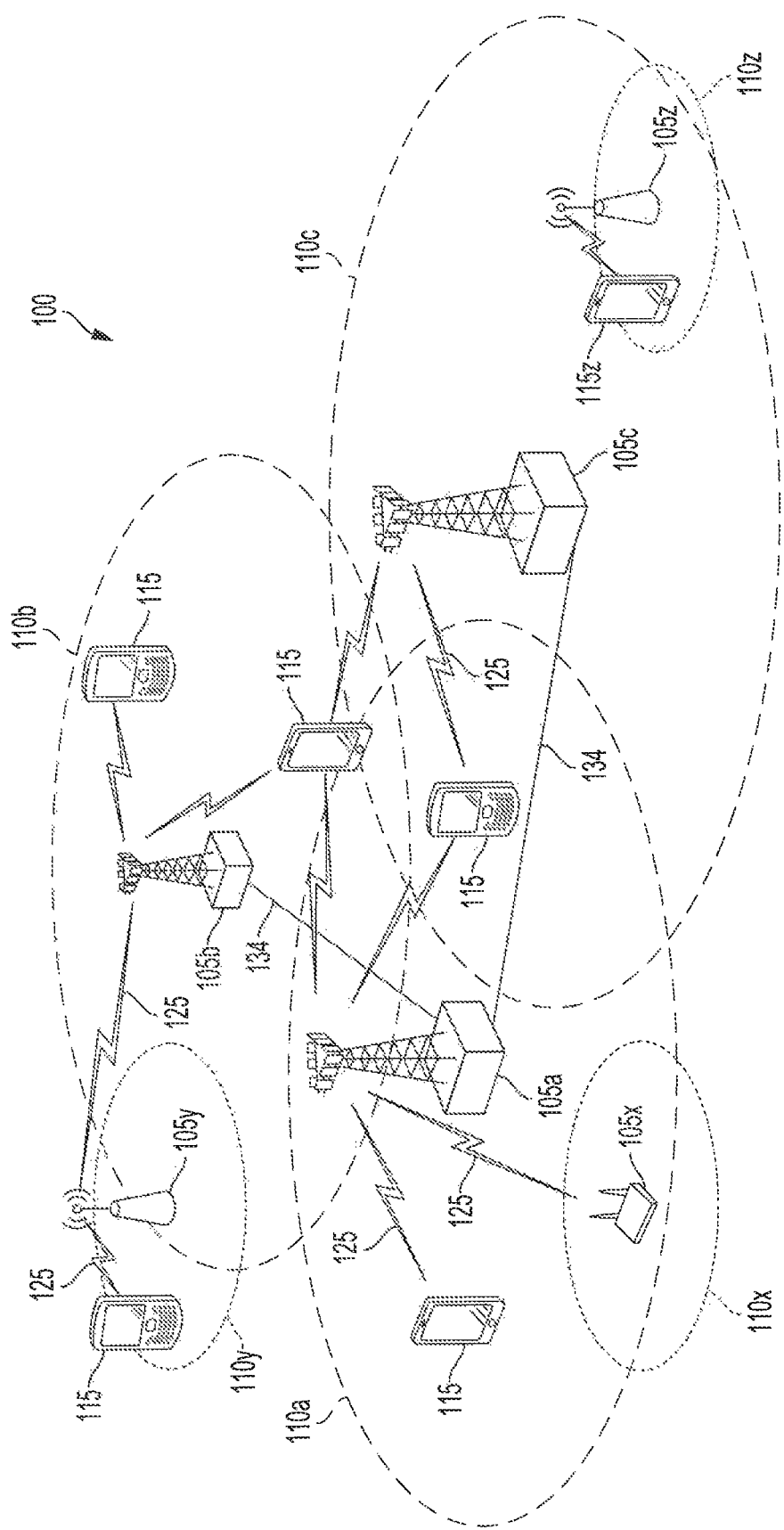
FIG. 1 is a block diagram illustrating details of a wireless communication system according to some embodiments of the present disclosure.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single carrier FDMA (SC-FDMA) networks, long term evolution (LTE) networks, Global System for Mobile Communications (GSM) networks, as well as other communications networks. As described herein, the terms "networks" and "systems" may be used interchangeably according to the particular context.

A CDMA, network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a universal mobile telecommunications system (UMTS)/GSM network. An operator network may also include one or more LTE networks, and/or one or more other networks. The various different network types may use different radio access technologies (RATs) and radio access networks (RANs).

OFDMA network may, for example, implement a radio technology such as evolved UTRA (E-UTRA), Institute of Electrical and Electronics Engineers (IEEE) 802.11, IEEE 802.16, IEEE 802.20, flash-OFDM and the like, UTRA, E-UTRA, and GSM are part of UMTS. In particular, LTE is a release of UMTS that uses E-UTRA, UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the UMTS mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.) While some examples may or may not be specifically directed to use cases or applications, a wide assortment of applicability of described innovations may occur, Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Turning back to FIG. 1 wireless network 100 includes a number of base stations, such as may comprise evolved node Bs (eNBs) or G node Bs (gNBs). These may be referred to as gNBs 105. A gNB may be a station that communicates with the UEs and may also be referred to as a base station, a node B, an access point, and the like. Each gNB 105 may provide communication coverage for a particular geographic area. In 3GPP, the term "cell" can refer to this particular geographic coverage area of a gNB and/or a gNB subsystem serving the coverage area, depending on the context in which the term is used. In implementations of wireless network 100 herein, gNBs 105 may be associated with a same operator or different operators (e.g., wireless network 100 may comprise a plurality of operator wireless networks) and may provide wireless communications using one or more of the same frequencies (e.g., one or more frequency band in licensed spectrum, unlicensed spectrum, or a combination thereof) as a neighboring cell.

A gNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. In the example shown in FIG. 1, gNBs 105a, 105b and 105c are macro gNBs for the macro cells 110a, 110b and 110c, respectively. gNBs 105x, 105y, and 105z are small cell gNBs, which may include pico or femto gNBs that provide service to small cells 110x, 110y, and 110z, respectively. A gNB may support one or multiple (e.g., two, three, four, and the like) cells.

Wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. In some scenarios, networks may be enabled or configured to handle dynamic switching between synchronous or asynchronous operations.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro gNBs, pico gNBs, femto gNBs, relays, and the like. In FIG. 1, a lightning bolt (e.g., communication links 125) indicates wireless transmissions between a UE and a serving gNB, which is a gNB designated to serve the UE on the downlink and/or uplink, or desired transmission between gNBs. Although backhaul communication 134 is illustrated as wired backhaul communications that may occur between gNBs, it should be appreciated that backhaul communications may additionally or alternatively be provided by wireless communications.

Figure 2:
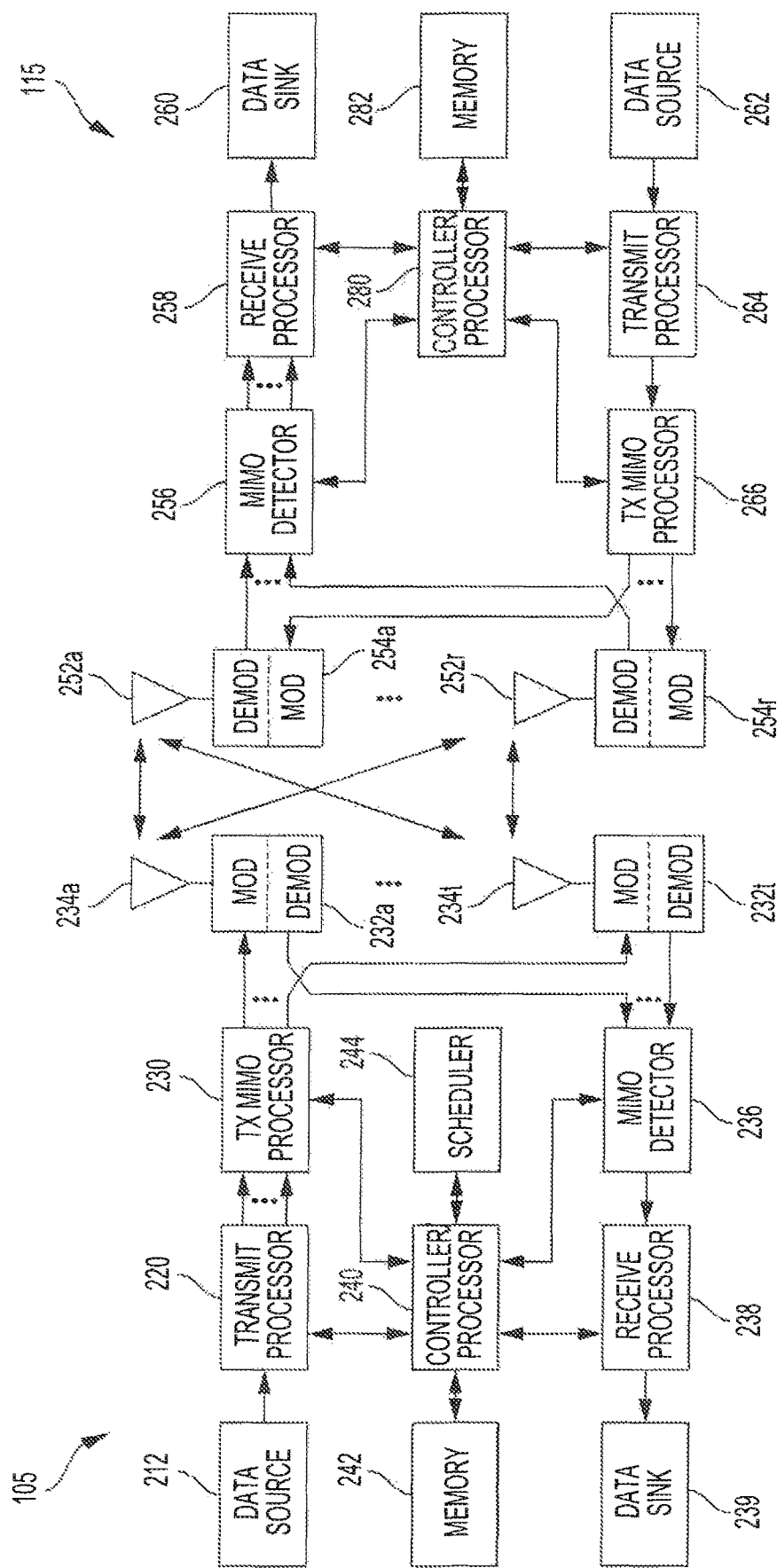
FIG. 2 is a block diagram conceptually illustrating a design of a base station/gNB and a UE configured according to some embodiments of the present disclosure.

FIG. 2 shows a block diagram of a design of base station/gNB 105 and UE 115.

These can be one of the base stations/gNBs and one of the UEs in FIG. 1. For a restricted association scenario (as mentioned above), the gNB 105 may be small cell gNB 105z in FIG. 1, and UE 115 may be UE 115z, which in order to access small cell gNB 105z, would be included in a list of accessible UEs for small cell gNB 105z. gNB 105 may also be a base station of some other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical control format indicator channel (PCFICH), physical hybrid-ARQ indicator channel) PHICH, physical downlink control channel (PDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS), secondary synchronization signal (SSS), and cell-specific reference signal (CRS). TX MIMO processor 230 may perform spatial processing (e.g., precoding) on the data symbols, the control symbols, and/or reference symbols, if applicable, and may provide output symbol streams to modulators (MODS) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from gNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at gNB 105 and UE 115, respectively. Controller/processor 240 and/or other processors and modules at gNB 105 and/or controllers/processor 280 and/or other processors and modules at UE 115 may perform or direct the execution of various processes for the techniques described herein, such as to perform or direct the execution illustrated in FIGS. 5 and 6, and/or other processes for the techniques described herein. Memories 242 and 282 may store data and program codes for gNB 105 and UE 115, respectively. Scheduler 244 may schedule UEs for data transmission on the downlink and/or uplink.

For a sounding reference signal (SRS) resource, a given X-port SRS resource spans N=1, 2, or 4 adjacent symbols within a slot where all X ports are mapped to each symbol of the resource. Within the resource, each of the X ports are mapped to the same set of subcarriers in the same set of physical resource blocks (PRBs) in the N SRS symbols. A given SRS resource can be configured as aperiodic, periodic, or semi-persistent. According to a periodic configuration, the resource is configured with a slot-level periodicity and slot-offset. According to a semi-persistent configuration, the resource is configured with a slot-level periodicity and slot-offset, and the semi-persistent SRS resource set is activated/deactivated by a media access control (MAC) control element (CE), According to an aperiodic configuration, the SRS transmission is triggered using downlink control information (DCI), and aperiodic SRS resource(s) are triggered on a per set basis by DCI. For example, a DL/UL/Group common DCI can be used to trigger an aperiodic SRS resource set.

Regarding SRS time domain location, an SRS resource can be configured to occupy a location within at least the last 6 symbols in a slot. From a UE perspective, no frequency division multiplexing (FDM) may occur between a SRS and a short physical uplink control channel (PUCCH), and when PUSCH is scheduled in a slot, a SRS may be configured at least after the scheduled PUSCH and the corresponding demodulation reference signal (DMRS). It is envisioned that an SRS may be configured before the scheduled PUSCH and the corresponding DMRS.

An SRS resource can be configured with a repetition factor R. In this case, the X ports are mapped to each symbol of the resource and within the resource. Each of the X ports may be mapped to the same set of subcarriers in the same set of PRBs in the N SRS symbols.

Figure 3A:
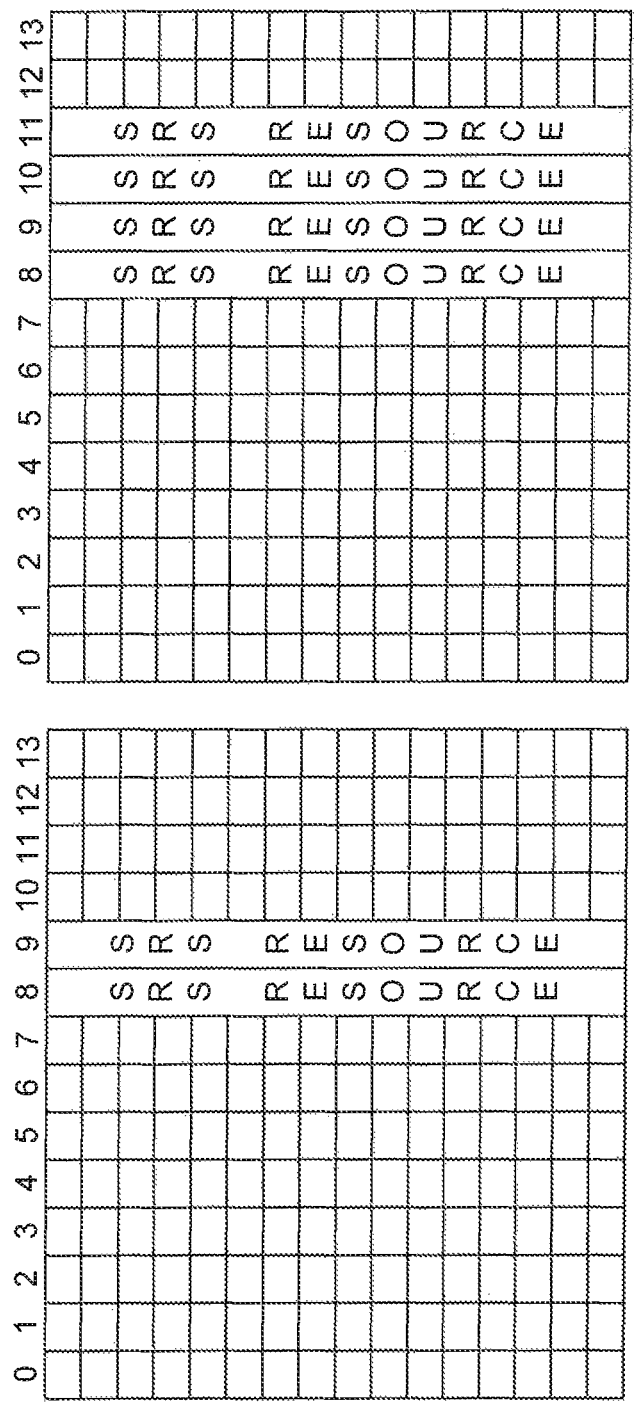
FIG. 3A is a block diagram illustrating sounding reference signal (SRS) resources and repetition according to some embodiments of the present disclosure.
Figure 3C:
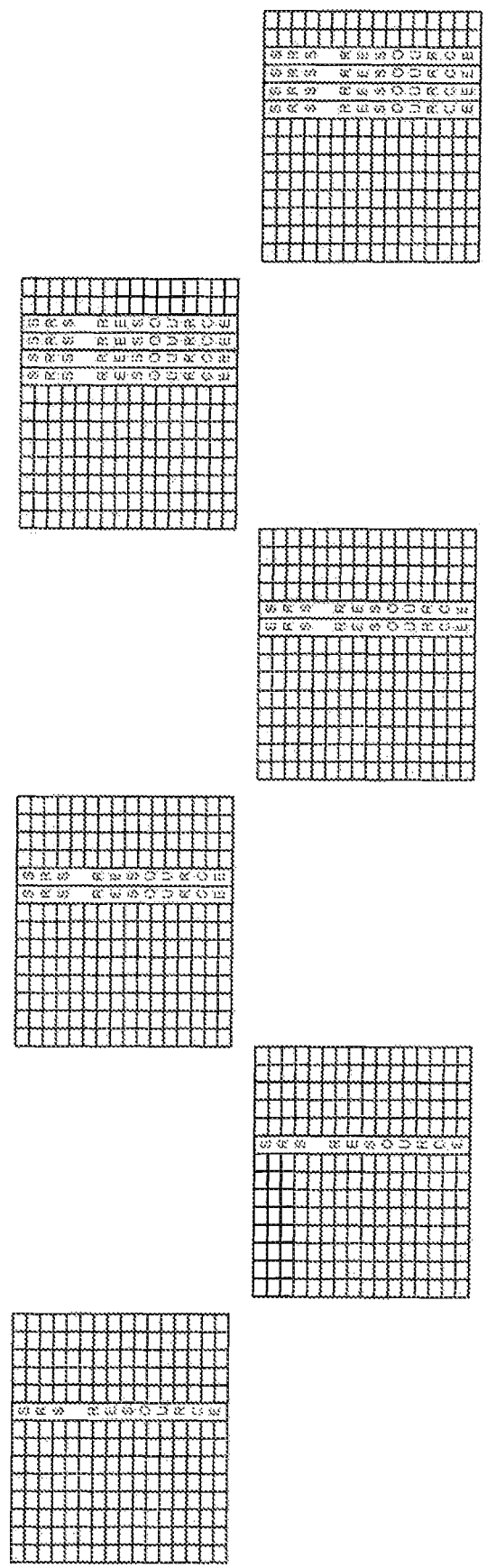
FIG. 3C is a block diagram illustrating SRS resources with inter-slot frequency hopping according to some embodiments of the present disclosure.

Referring to FIGS. 3A-3C, SRS resources are illustrated with repetition and hopping. For example, FIG. 3A illustrates SRS resources and simple repetition. In contrast to simple repetition, FIG. 3B illustrates SRS resources with intra-slot frequency hopping and FIG. 3C illustrates SRS resources with inter-slot frequency hopping.

Figure 4A:
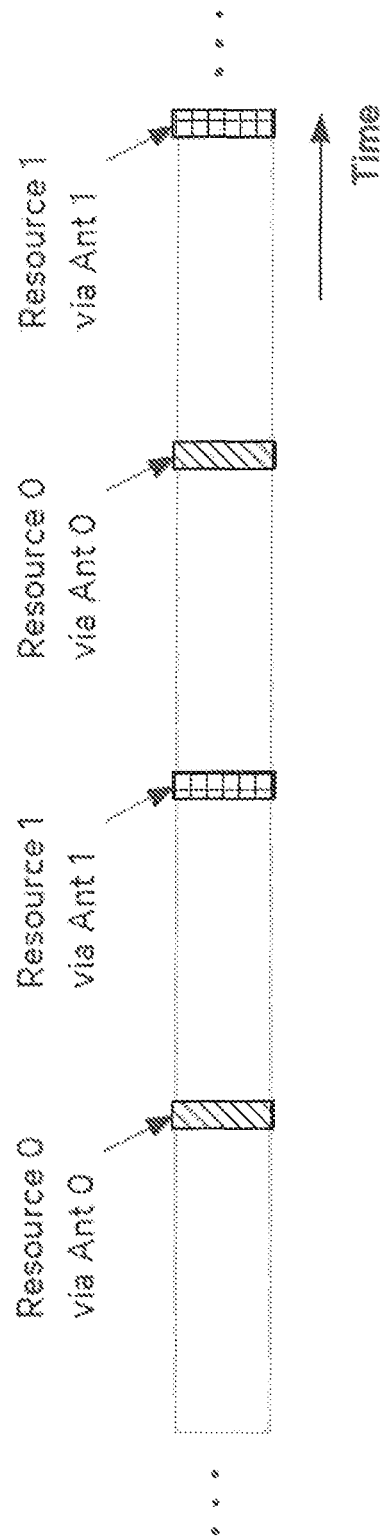
FIG. 4A is a block diagram illustrating SRS user equipment (UE) antenna switching for a 1T2R resource set according to some embodiments of the present disclosure.
Figure 4B:
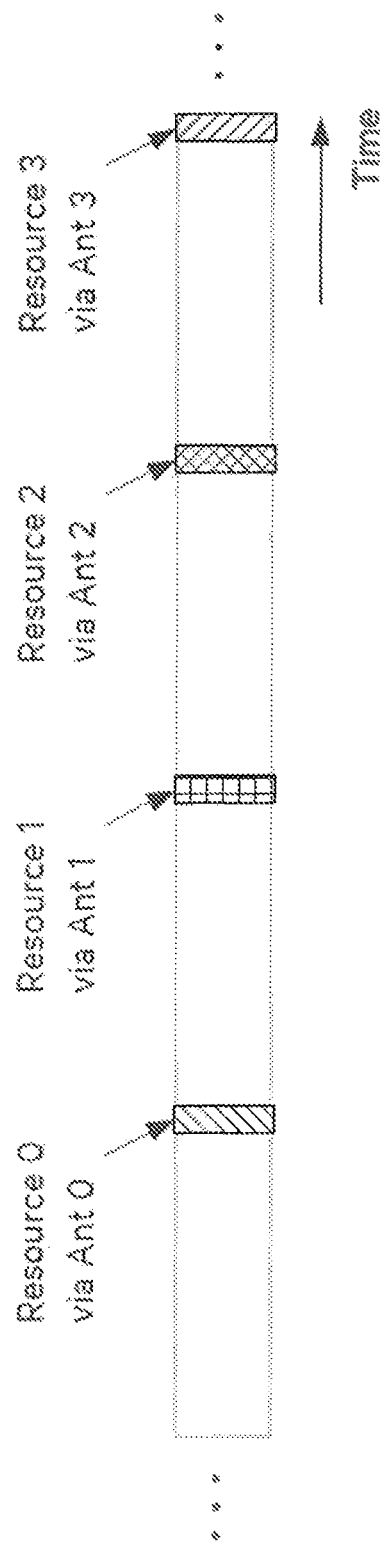
FIG. 4B is a block diagram illustrating SRS UE antenna switching for a 1T4R resource set according to some embodiments of the present disclosure.
Figure 4C:
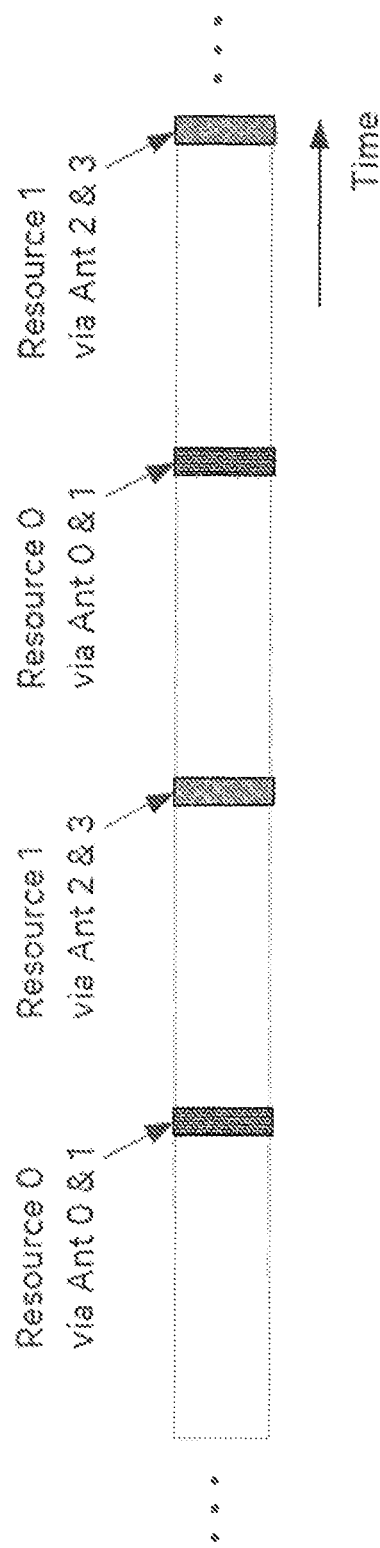
FIG. 4C is a block diagram illustrating SRS LE antenna switching for a 2T4R resource set according to some embodiments of the present disclosure.

Referring to FIGS. 4A-4C, SRS UE antenna switching is shown for 2 UE antenna ports (1T2R) and 4 UE antenna ports (1T4R) and (2T4R). For example, referring to FIG. 4A, antenna switching for 2 UE antenna ports (1T2R) utilizes two 1-port SRS resources, each transmitted via an antenna. Additionally, referring to FIG. 4B, antenna switching for four UE antenna ports (1T4R) utilizes four 1-port SRS resources, each transmitted via an antenna. Also, referring to FIG. 4C, antenna switching for 4 UE antenna ports (2T4R) utilizes two 2-port SRS resources, each transmitted via an antenna pair. According to these antenna switching techniques, different SRS resources are transmitted in different symbols, either in the same slot or in different slots. Also, a guard period of Y symbols in-between the SRS resources is used in case the SRS resources are transmitted in the same slot.

Turning to FIGS. 5A and 5B, the guard period (labeled in FIGS. 5A and 5B as "Gap") is defined by a value of Y that corresponds to enough symbols to span at least 15 μsec. As shown in FIG. 5A, intra-slot antenna switching for 1T4R. utilizes 4 separate resources, each one with one port, and thus uses a total of 7 symbols in a slot due to inclusion of 1 guard symbol after every sounding opportunity. Alternatively, as shown in FIG. 5B, the UE can sound 2 ports in one slot, and 2 in the next slot, or sound 3 antennas in the first slot (5 symbols), and 1 in the next, and so on. It is envisioned that SRS UE antenna switching may be an optional feature. It is also envisioned that a LTE may report to a base station which. antennas can be sounded concurrently (called antenna port groups) depending on whether the UE is in an UL MIMO capable mode of operation.

In accordance with the present disclosure, an SRS resource set is a collection of SRS resources having same power control information, and the SRS resources correspond to a collection of antenna ports. An SRS resource corresponds to one or multiple SRS ports, and each SRS port may correspond to an actual UE physical antenna, or a virtual antenna constructed by an analog, digital, or hybrid precoding operation of the UE physical antennas. In this context, it is envisioned that 1T4R antenna switching for SRS transmission may be supported by two aperiodic SRS resource sets. For example, two aperiodic SRS resource sets may have a total of four SRS resources transmitted in different symbols of two different slots, with each SRS resource consisting of a single SRS port, and the SRS port of each resource being associated with a different UE antenna port. Each of the two SRS resource sets may consist of two SRS resources, or one SRS resource set may consist of a single SRS resource and the other SRS resource set may consist of three SRS resources. For 1T4R, it is also envisioned that the UE may expect the same value for the higher layer parameters alpha-srs, p0-srs, srs-pathlossReference-rs-contig and srs-pcadjustment-state-config in the two SRS resource sets. In this context, topics of interest include UE ambiguity if two DCI triggers separately trigger two SRS resource sets, the gap before or after any SRS resource set for antenna switching, and the number of SRS resource sets for other cases.

When UE antenna switching is enabled by the higher layer parameter SRS-SetUse being set to 'antenna switching' for a UE that supports transmit antenna switching, a UE may be configured with one of the following configurations depending on the UE capability:

(1T2R) SRS resource set with two SRS resources transmitted in different symbols, each SRS resource consisting of a single SRS port, and where the SRS port of the second resource is associated with a different UE antenna port than the SRS port of the first resource;

(2T4R) SRS resource set with two SRS resources transmitted in different symbols, each SRS resource consisting of two SRS ports, and where the SRS port pair of the second resource is associated with a different UE antenna port pair than the SRS port pair of the first resource;

(persistent or semi-persistent 1T4R) SRS resource set configured with higher layer parameter resourceType in SRS-ResourceSet set to 'periodic' or 'semi-persistent' with four SRS resources transmitted in different symbols, each SRS resource consisting of a single SRS port, and where the SRS port of each resource is associated with a different UE antenna port;

(A-1T4R) two SRS resource sets configured with higher layer parameter resourceType in SRS-ResourceSet set to 'aperiodic' with a total of four SRS resources transmitted in different symbols of two different slots, and where the SRS port of each SRS resource is associated with a different UE antenna port. The two sets are each configured with two SRS resources, or one set is configured with one SRS resource and the other set is configured with three SRS resources; or (T=R) SRS resource set with one SRS resource, where the number of SRS ports is equal to 1, 2, or 4.

Regarding spatial RX for SRS resource, the spatial relation between a reference reference signal (RS) and the target SRS may be carried out using the higher layer parameter spatialRelationInfo. If the reference RS is configured, then the spatialRelationInfo parameter may contain the ID of the reference RS, and the UE employs a reciprocal of the reference RS as the SRS on the UL The reference RS can be a SS/PBCH block, a CSI-RS, or an SRS configured on the same or different component carrier and/or bandwidth part as the target SRS.

Supporting multiple SRS resource sets for antenna switching beyond the aperiodic 1T4R case gives rise to potential problems. In particular, increased UE complexity may result if such a mode does not come with a few related constraints. For example, if the UE is requested to sound using both the 1T4R and 2T4R SRS resource set configurations, this can result in higher complexity and more difficult hook keeping. Additionally, If the UE is requested to sound on the same slot with multiple SRS resource sets, then each set may have different TX power control, resulting in a higher number of TX automatic gain control (AGC) changes inside the slot. Also, configuration of multiple SRS resource sets that have both the same timing-behavior and antenna switching type is normally not used. Such a configuration, however, may be used if the sets are configured with different spatial RX, and thus different beams.

The present disclosure proposes a number of constraints related to antenna switching that may be specified for supporting multiple SRS resource sets for antenna switching:

Constraint 1: The UE does not expect to be configured with multiple SRS resource sets for antenna switching unless all are of the same "Antenna switching type" (e.g., all 1T4R). For example, the UE will not be configured with a set corresponding to 1T4R, and another set corresponding to 2T4R. The sets may have different timing behavior, for example one is periodic, the other aperiodic, the other semi-persistent.

Constraint 2: The UE does not expect to transmit SRS resources from multiple SRS resource sets for antenna switching on the same slot.

Constraint 3: The UE does not expect to be configured with more than one periodic or semi-persistent SRS resource set for antenna switching of a specific "Antenna switching type," unless their spatial RX information is different, thus resulting in different beams. For example, the UE will not be configured with two periodic 1T4R. resource sets, or two semi-persistent 1T4R resource sets in a bandwidth part (BWP) unless the spatial RX information is different between all the resources of the sets. It is understood that combinations (e.g., any combination) of constraint 1, constraint 2, and constraint 3 discussed above can be used.

Regarding the above constraints, it is envisioned that a UE may send a capability message to the base station to indicate which, if any, of the above constraints to apply in configuring the UE in order to reduce the complexity at the UE when transmitting. It is envisioned that these capabilities may be based on UE hardware, as opposed to being based on a UE configuration. It is also envisioned that the message may contain indications of the UE capabilities and/or indications of specific constraints or sets of constraints. When the base station receives this message it may apply the appropriate constraints based on the contents of the message. It is envisioned that the base station may apply constraints specified in the message or determine the constraints to apply based on UE capabilities indicated in the message. Accordingly, when the UE receives an SRS resource set configuration message from the base station, the configuration thereof may conform to the constraints as signaled by the UE. The UE, thus, may transmit SRS according to multiple configurations that conform to the signaled constraints.

Turning to FIG. 6A, a method of wireless communication carried out by a base station begins at block 600. Block 600 includes receiving, by a base station from a user equipment (UE), a capability message indicating antenna switching constraint(s) regarding configuration. of multiple sounding reference signal (SRS) resource sets for antenna switching by the UE. The configuration of multiple SRS resource sets may be arranged by the base station for the UE. The particular constraints signaled by the UE may be based on UE capability/hardware. The constraint(s) may relate to an antenna switching type, with reference, for example, to constraint 1 and constraint 3 discussed above. Additionally or alternatively, the constraint(s) may related to switching in a same slot, with reference, for example, to constraint 2 discussed above. In one example, at least one constraint of the one or more constraints can include constraint 1, constraint 2, and/or constraint 3 discussed above. Processing may proceed from block 600 to block 602. Means for performing the functionality of block 600 may, but not necessarily, include, for example, antennas 234, demodulators 232, MIMO detector 236, receive processor 238, controller/processor 240, and/or memory 242 with reference to FIG. 2 and wireless radios 801 and/or capability receiver 802 with reference to FIG. 8.

Block 602 includes transmitting a configuration message, by the base station to the UE, that configures the UE with the multiple SRS resource sets according to the constraint(s). The constraints applied by the base station in generating the multiple SRS resource sets may include one or multiple constraints. One such constraint may be a constraint that the UE will not be configured with multiple SRS resource sets for antenna switching unless all are of a same antenna switching type, such as 1T2R, 2T4R, periodic or semi-persistent 1T4R, A-1T4R, or T=R. Another such constraint may be that the UE will not be configured to transmit SRS resources from multiple SRS resource sets for antenna switching on a same slot. A further such constraint may be that the UE will not be configured with two or more periodic or semi-persistent SRS resource sets for antenna switching of a same antenna switching type unless the two or more periodic or semi-persistent SRS resource sets have different spatial reception information. It is envisioned that the base station may apply any or all of the constraints in compliance with the UE capabilities/hardware signaled in the capability message received at block 600. Processing may proceed from block 602 to block 604. Means for performing the functionality of block 602 may, but not necessarily, include, for example, controller/processor 240, memory 242, transmit processor 220, TX MIMO processor 230, modulators 232, and/or antennas 234 with reference to FIG. 2 and wireless radios 801 and/or configuration transmitter 803 with reference to FIG. 8.

Block 604 includes receiving one or more SRS, by the base station, transmitted by the UE, according to the configuration of the multiple SRS resource sets signaled in block 602. After block 604, the process may end. Alternatively, the process may return to block 600 or block 602. Means for performing the functionality of block 604 may, but not necessarily, include, for example, antennas 234, demodulators 232, MIMO detector 236, receive processor 238, controller/processor 240, and/or memory 242 with reference to FIG. 2 and wireless radios 801 and/or SRS receiver 803 with reference to FIG. 8.

Referring to FIG. 6B, a method of wireless communication carried out by a user equipment (UE) begins at block 650. Block 650 includes transmitting, by the UE to a base station, a capability message indicating constraint(s) regarding configuration of multiple sounding reference signal (SRS) resource sets for antenna switching by the UE. The configuration of multiple SRS resource sets may be arranged by the base station for the UE. The particular constraints signaled by the UE may be based on UE capability/hardware. The constraint(s) may relate to an antenna switching type, with reference, for example, to constraint 1 and constraint 3 discussed above. Additionally or alternatively, the constraint(s) may related to switching in a same slot, with reference, for example, to constraint 2 discussed above. In one example, at least one constraint of the one or more constraints can include constraint 1, constraint 2, and/or constraint 3 discussed above. Processing may proceed from block 650 to block 652. Means for performing the functionality of block 650 may, but not necessarily, include, for example, controller/processor 280, memory 282, transmit processor 264, TX MIMO processor 266, modulators 254, and/or antennas 252 with reference to FIG. 2 and wireless radios 901 and/or capability transmitter 902 with reference to FIG. 9.

Block 652 includes receiving, by the UE from the base station, a configuration message that configures the UE with the multiple SRS resource sets according to the constraints. One such constraint may be a constraint that the UE will not be configured with multiple SRS resource sets for antenna switching unless all are of a same antenna switching type, such as 1T2R, 2T4R, periodic or semi-persistent 1T4R, A-1T4R, or Another such constraint may be that the UE will not be configured to transmit SRS resources from multiple SRS resource sets for antenna switching on a same slot. A further such constraint may be that the UE will not be configured with two or more periodic or semi-persistent SRS resource sets for antenna switching of a same antenna switching type unless the two or more periodic or semi-persistent SRS resource sets have different spatial reception information. It is envisioned that the base station may apply any or all of the constraints in compliance with the UE capabilities/hardware signaled in the capability message transmitted at block 650. Processing may proceed from block 652 to block 654. Means for performing the functionality of block 652 may, but not necessarily, include, for example, antenna 252, demodulators 254, MIMO detector 256, receive processor 258, controller/processor 280, and/or memory 282 with reference to FIG. 2 and wireless radios 901 and/or configuration. receiver 903 with reference to FIG. 9.

Block 654 includes transmitting, by the UE to the base station, one or more SRS according to the configuration of the multiple SRS resource sets received in block 652. After block 654, the process may end. Alternatively, the process may return to block 650 or block 652. Means for performing the functionality of block 654 may, but not necessarily, include, for example, controller/processor 280, memory 282, transmit processor 264, TX MIMO processor 266, modulators 254, and/or antenna 252 with reference to FIG. 2 and wireless radios 901 and/or SRS transmitter 904 with reference to FIG. 9.

Turning to FIG. 7A, a method of wireless communication carried out by a base station begins at block 700. Block 700 includes transmitting a configuration message, by a base station to a user equipment (UE), that configures the UE, according to one or more antenna. switching constraints (e.g., one or more constraints related to an antenna switching type and/or switching in a same slot), with multiple sounding reference signal (SRS) resource sets for antenna switching by the UE. The constraints applied by the base station in generating the multiple SRS resource sets may include one or multiple constraints. One such constraint may be a constraint that the UE will not be configured with multiple SRS resource sets for antenna switching unless all are of a same antenna switching type, such as 1T2R, 2T4R, persistent or semi-persistent 1T4R, A-1T4R, car T=R. Another such constraint may be that the UE will not be configured to transmit SRS resources from multiple SRS resource sets for antenna switching on a same slot. A further such constraint may be that the UE will not be configured with two or more periodic or semi-persistent SRS resource sets for antenna switching of a same antenna switching type unless the two or more periodic or semi-persistent SRS resource sets have different spatial reception information. Processing may proceed from block 700 to block 702. Means for performing the functionality of block 700 may, but not necessarily, include, for example, controller/processor 240, memory 242, transmit processor 220, TX MIMO processor 230, modulators 232, and/or antennas 234 with reference to FIG. 2 and wireless radios 801 and/or configuration transmitter 803 with reference to FIG. 8.

Block 702 includes receiving one or more SRS, by the base station, transmitted by the UE according to the configuration of the multiple SRS resource sets signaled in block 700. After block 702, the process may end. Alternatively, the process may return to block 700. Means for performing the functionality of block 702 may, but not necessarily, include, for example, antennas 234, demodulators 232, MIMO detector 236, receive processor 238, controller/processor 240, and/or memory 242 with reference to FIG. 2 and wireless radios 801 and/or SRS receiver 803 with reference to FIG. 8

Referring to FIG. 7B, a method of wireless communication carried out by a user equipment (UE) begins at block 750. Block 750 includes receiving, by a user equipment (UE) from a base station, a configuration message that configures the UE, according to one or more antenna switching constraints (e.g., one or more constraints related to an antenna switching type and/or switching in a same slot), with multiple sounding reference signal (SRS) resource sets for antenna switching by the UE. One such constraint may be a constraint that the UE will not be configured with multiple SRS resource sets for antenna switching unless all are of a same antenna switching type, such as 1T2R, 2T4R, periodic or semi-persistent 1T4R, A-1T4R, or T=R. Another such constraint may be that the UE will not be configured to transmit SRS resources from multiple SRS resource sets for antenna switching on a same slot. A further such constraint may be that the UE will not be configured with two or more periodic or semi-persistent SRS resource sets for antenna switching of a same antenna switching type unless the two or more periodic or semi-persistent SRS resource sets have different spatial reception information. Processing may proceed from block 750 to block 752. Means for performing the functionality of block 750 may, but not necessarily, include, for example, antennas 252, demodulators 254, MIMO detector 256, receive processor 258, controller/processor 280, and/or memory 282 with reference to FIG. 2 and wireless radios 901 and/or configuration receiver 903 with reference to FIG. 9.

Block 752 includes transmitting, by the UE to the base station, one or more SRS according to the configuration of the multiple SRS resource sets received in block 750. After block 752, the process may end. Alternatively, the process may return to block 750. Means for performing the functionality of block 752 may, but not necessarily, include, for example, controller/processor 280, memory 282, transmit processor 264, TX MIMO processor 266, modulators 254, and/or antenna 252 with reference to FIG. 2 and wireless radios 901 and/or SRS transmitter 904 with reference to FIG. 9.

Figure 8:
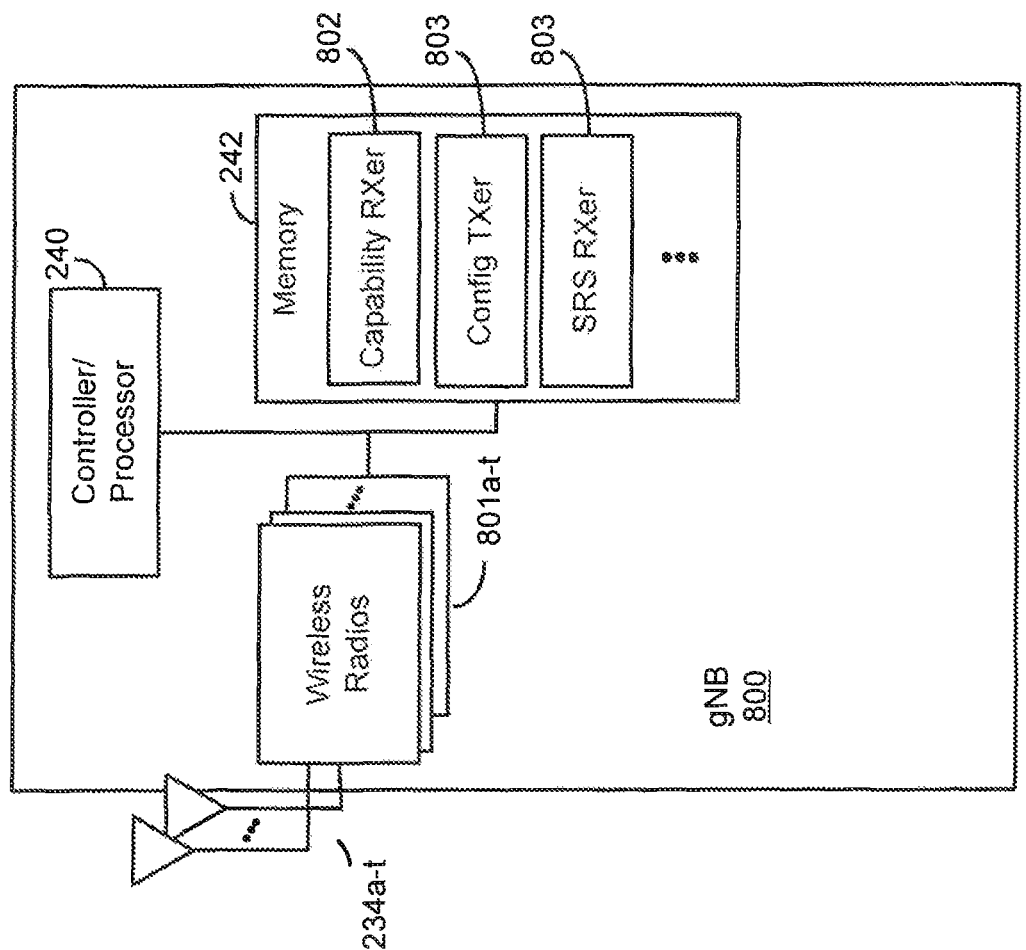
FIG. 8 is a block diagram illustrating a base station configured according to some embodiments of the present disclosure.

Turning now to FIG. 8, a base station 800, such as a NR-SS base station 105 (see FIG. 2), may have a controller/processor 240, a memory 242, and antennas 234a through 234t, as described above. The base station 800 may also have wireless radios 801a to 801t that comprise additional components also described above with reference to FIG. 2. The memory 242 of base station 800 stores algorithms that configure controller/processor 240 to carry out procedures as described above with reference to FIGS. 3-7.

Algorithms stored by memory 242 configure controller/processor 240 to carry out operations relating to wireless communication by the base station 800, as previously described. For example, capability receiver 802 configures controller/processor 240 to carry out operations that include receiving a capability message in any manner previously described. Additionally, configuration transmitter 803 configures controller/processor 240 to carry out operations that include transmitting a configuration message that configures the UE with multiple SRS resource sets according to constraints in any manner previously described. Also, SRS receiver 804 configures controller/processor 240 to carry out operations that include receiving one or more SRS transmitted by the UE according to the configuration of the multiple SRS resource sets in any manner previously described.

Figure 9:
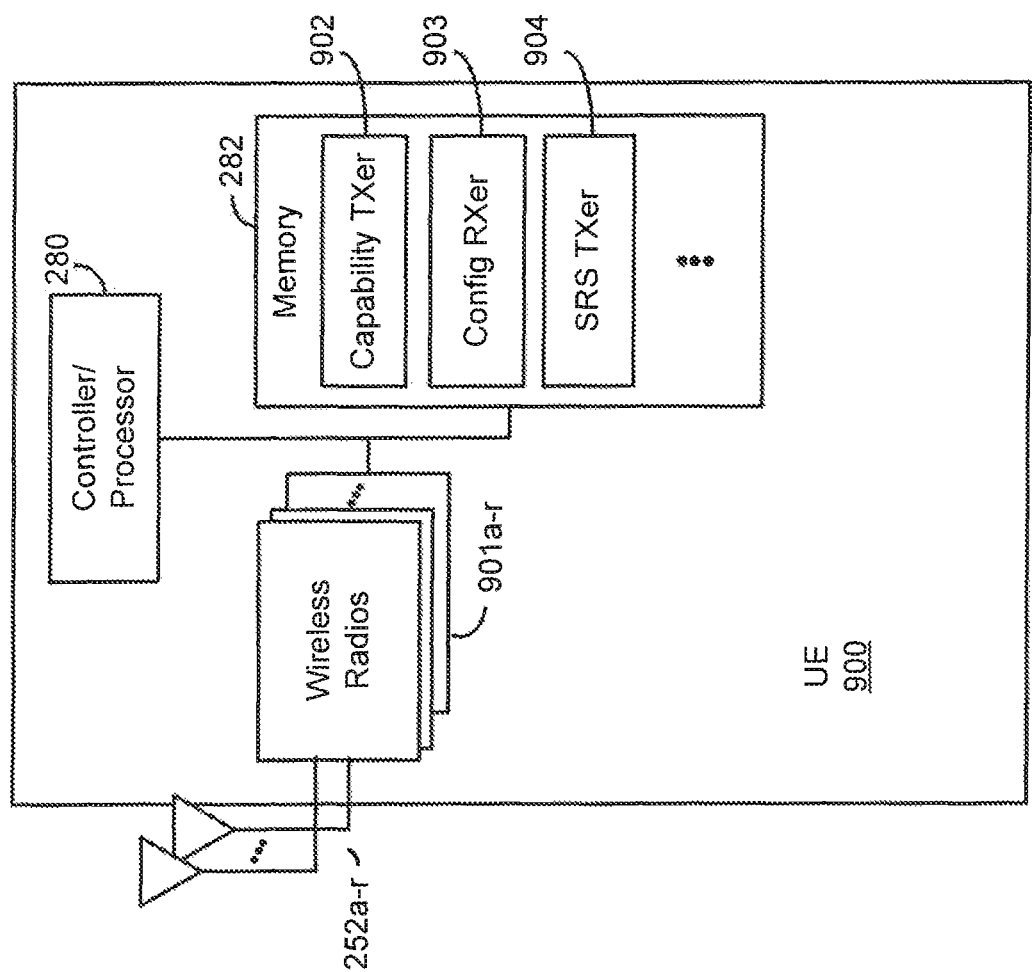
FIG. 9 is a block diagram illustrating a UE configured according to some embodiments of the present disclosure.

Turning now to FIG. 9, a UE 900, such as a UE 115 (see FIG. 2), may have a controller/processor 280, a memory 282, and antennas 252a through 252r, as described above. UE 900 may also have wireless radios 901a to 901r that comprise additional components also described above with reference to FIG. 2, The memory 282 of UE 900 stores algorithms that configure controller/processor 280 to carry out procedures as described above with reference to FIGS. 3-7.

Algorithms stored by memory 282 configure controller/processor 280 to carry out procedures relating to wireless communication by the UE 900, as previously described. For example, capability transmitter 902 configures controller/processor 280 to carry out operations that include transmitting, to a base station, a capability message indicating constraints regarding configuration, by the base station for the UE, of multiple sounding reference signal (SRS) resource sets for antenna switching by the UE in any manner previously described. Additionally, configuration receiver 903 configures controller/processor 280 to carry out operations that include receiving, from the base station, a configuration message that configures the UE with the multiple SRS resource sets according to the constraints in any manner previously described. Also, SRS transmitter 904 configures controller/processor 280 to carry out operations that include transmitting, to the base station, one or more SRS according to the configuration of the multiple SRS resource sets in any manner previously described.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 2 and 6-9) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality, Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in random-access memory (RAM) memory, flash memory, read-only memory (ROM) memory, erasable programmable ROM (EPROM) memory, electrically erasable programmable ROM (EEPROM) memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically. While discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   transmitting a configuration message, by a base station to a user equipment (UE), that configures the UE, according to one or more antenna switching constraints, with multiple sounding reference signal (SRS) resource sets for antenna switching by the UE;
   receiving one or more SRS, by the base station, transmitted by the UE according to the configuration of the multiple SRS resource sets; and
   receiving, by the base station from the UE, a capability message indicating the one or more antenna switching constraints, wherein the one or more antenna switching constraints include an antenna switching constraint that the UE will not be configured to transmit SRS resources from multiple SRS resource sets for antenna switching on a same slot.

2. The method of claim 1, wherein the one or more antenna switching constraints include at least one antenna switching constraint selected from the group consisting of:
   the UE will not be configured with multiple SRS resource sets for antenna switching unless all are of a same antenna switching type on a same slot;
   the UE will not be configured with two or more periodic or semi-persistent SRS resource sets for antenna switching of a same antenna switching type on a same slot unless the two or more periodic or semi-persistent SRS resource sets have different spatial reception information; or
   combinations thereof.

3. The method of claim 2, wherein the at least one antenna switching constraint includes the antenna switching constraint that the UE will not be configured with multiple SRS resource sets for antenna switching unless all of the SRS resource sets are of a same antenna switching type.

4. The method of claim 3, wherein the multiple SRS resource sets configured to the UE have different timing behavior.

5. The method of claim 3, wherein the same antenna switching type is selected from the group consisting of:
- a type of SRS resource set (1T2R) having two SRS resources transmitted in different symbols, each SRS resource consisting of a single SRS port, wherein an SRS port of a second resource of the two SRS resources is associated with a different UE antenna port than another SRS port of a first resource of the two SRS resources;
- a type of SRS resource set (2T4R) having two SRS resources transmitted in different symbols, each SRS resource consisting of two SRS ports, wherein an SRS port pair of a second resource of the two SRS resources is associated with a different UE antenna port pair than another SRS port pair of a first resource of the two SRS resources;
- a type of SRS resource set (periodic or semi-persistent 1T4R) configured with a higher layer parameter resourceType in SRS-ResourceSet set to 'periodic' or 'semi-persistent' with four SRS resources transmitted in different symbols, each SRS resource consisting of a single SRS port, wherein an SRS port of each resource is associated with a different UE antenna port;
- a type of SRS resource set (A-1T4R) in which two SRS resource sets are configured with a higher layer parameter resourceType in SRS-ResourceSet set to 'aperiodic' with a total of four SRS resources transmitted in different symbols of two different slots, wherein:
  - an SRS port of each SRS resource is associated with a different UE antenna port, and
  - at least one of:
    - the two SRS resource sets are each configured with two SRS resources, or
    - one set is configured with one SRS resource and another set is configured with three SRS resources; or
- a type of SRS resource set (T=R) having one SRS resource, wherein a number of SRS ports is equal to 1, 2, or 4.

6. The method of claim 2, wherein the at least one antenna switching constraint includes the antenna switching constraint that the UE will not be configured with two or more periodic or semi-persistent SRS resource sets for antenna switching of a same antenna switching type unless the two or more periodic or semi-persistent SRS resource sets have different spatial reception information.

7. The method of claim 6, wherein the same antenna switching type is a type of SRS resource set configured with a higher layer parameter resourceType in SRS-ResourceSet set to 'periodic' or 'semi-persistent' with four SRS resources transmitted in different symbols, each SRS resource consisting of a single SRS port, wherein an SRS port of each resource is associated with a different UE antenna port.

8. A method of wireless communication, comprising:
- receiving a configuration message, by a user equipment (UE) from a base station, that configures the UE, according to one or more antenna switching constraints, with multiple sounding reference signal (SRS) resource sets for antenna switching by the UE;
- transmitting one or more SRS, by the UE to the base station, according to the configuration of the multiple SRS resource sets; and
- transmitting, by the UE to the base station, a capability message indicating the antenna switching constraints, wherein the one or more antenna switching constraints include an antenna switching constraint that the UE will not be configured to transmit SRS resources from multiple SRS resource sets for antenna switching on a same slot.

9. The method of claim 8, wherein the one or more antenna switching constraints include at least one antenna switching constraint selected from the group consisting of:
- the UE will not be configured with multiple SRS resource sets for antenna switching unless all are of a same antenna switching type on a same slot;
- the UE will not be configured with two or more periodic or semi-persistent SRS resource sets for antenna switching of a same antenna switching type on a same slot unless the two or more periodic or semi-persistent SRS resource sets have different spatial reception information; or
- combinations thereof.

10. The method of claim 9, wherein the at least one antenna switching constraint includes the antenna switching constraint that the UE will not be configured with multiple SRS resource sets for antenna switching unless all of the SRS resource sets are of a same antenna switching type.

11. The method of claim 10, wherein the multiple SRS resource sets configured to the UE have different timing behavior.

12. The method of claim 10, wherein the same antenna switching type is selected from the group consisting of:
- a type of SRS resource set (1T2R) having two SRS resources transmitted in different symbols, each SRS resource consisting of a single SRS port, wherein an SRS port of a second resource of the two SRS resources is associated with a different UE antenna port than another SRS port of a first resource of the two SRS resources;
- a type of SRS resource set (2T4R) having two SRS resources transmitted in different symbols, each SRS resource consisting of two SRS ports, wherein an SRS port pair of a second resource of the two SRS resources is associated with a different UE antenna port pair than another SRS port pair of a first resource of the two SRS resources;
- a type of SRS resource set (periodic or semi-persistent 1T4R) configured with a higher layer parameter resourceType in SRS-ResourceSet set to 'periodic' or 'semi-persistent' with four SRS resources transmitted in different symbols, each SRS resource consisting of a single SRS port, wherein an SRS port of each resource is associated with a different UE antenna port;
- a type of SRS resource set (A-1T4R) in which two SRS resource sets are configured with a higher layer parameter resourceType in SRS-ResourceSet set to 'aperiodic' with a total of four SRS resources transmitted in different symbols of two different slots, wherein:
  - an SRS port of each SRS resource is associated with a different UE antenna port, and
  - at least one of:
    - the two SRS resource sets are each configured with two SRS resources, or
    - one set is configured with one SRS resource and another set is configured with three SRS resources, or
- a type of SRS resource set (T=R) having one SRS resource, wherein a number of SRS ports is equal to 1, 2, or 4.

13. The method of claim 9, wherein the at least one antenna switching constraint includes the antenna switching constraint that the UE will not be configured with two or more periodic or semi-persistent SRS resource sets for antenna switching of a same antenna switching type unless the two or more periodic or semi-persistent SRS resource sets have different spatial reception information.

14. The method of claim 13, wherein the same antenna switching type is a type of SRS resource set configured with a higher layer parameter resourceType in SRS-ResourceSet set to 'periodic' or 'semi-persistent' with four SRS resources transmitted in different symbols, each SRS resource consisting of a single SRS port, wherein an SRS port of each resource is associated with a different UE antenna port.

15. An apparatus for wireless communication, comprising:
   means for transmitting a configuration message, by a base station to a user equipment (UE), that configures the UE, according to one or more antenna switching constraints, with multiple sounding reference signal (SRS) resource sets for antenna switching by the UE;
   means for receiving one or more SRS, by the base station, transmitted by the UE according to the configuration of the multiple SRS resource sets; and
   means for receiving, by the base station from the UE, a capability message indicating the antenna switching constraints, wherein the one or more antenna switching constraints include an antenna switching constraint that the UE will not be configured to transmit SRS resources from multiple SRS resource sets for antenna switching on a same slot.

16. The apparatus of claim 15, wherein the one or more antenna switching constraints include at least one antenna switching constraint selected from the group consisting of:
   the UE will not be configured with multiple SRS resource sets for antenna switching unless all are of a same antenna switching type on a same slot;
   the UE will not be configured with two or more periodic or semi-persistent SRS resource sets for antenna switching of a same antenna switching type on a same slot unless the two or more periodic or semi-persistent SRS resource sets have different spatial reception information; or
   combinations thereof.

17. The apparatus of claim 16, wherein the at least one antenna switching constraint includes the antenna switching constraint that the UE will not be configured with multiple SRS resource sets for antenna switching unless all of the SRS resource sets are of a same antenna switching type.

18. The apparatus of claim 17, wherein the multiple SRS resource sets configured to the UE have different timing behavior.

19. The apparatus of claim 17, wherein the same antenna switching type is selected from the group consisting of:
   a type of SRS resource set (1T2R) having two SRS resources transmitted in different symbols, each SRS resource consisting of a single SRS port, wherein an SRS port of a second resource of the two SRS resources is associated with a different UE antenna port than another SRS port of a first resource of the two SRS resources;
   a type of SRS resource set (2T4R) having two SRS resources transmitted in different symbols, each SRS resource consisting of two SRS ports, wherein an SRS port pair of a second resource of the two SRS resources is associated with a different UE antenna port pair than another SRS port pair of a first resource of the two SRS resources;
   a type of SRS resource set (periodic or semi-persistent 1T4R) configured with a higher layer parameter resourceType in SRS-ResourceSet set to 'periodic' or 'semi-persistent' with four SRS resources transmitted in different symbols, each SRS resource consisting of a single SRS port, wherein an SRS port of each resource is associated with a different UE antenna port;
   a type of SRS resource set (A-1T4R) in which two SRS resource sets are configured with a higher layer parameter resourceType in SRS-ResourceSet set to 'aperiodic' with a total of four SRS resources transmitted in different symbols of two different slots, wherein:
      an SRS port of each SRS resource is associated with a different UE antenna port, and
      at least one of:
         the two SRS resource sets are each configured with two SRS resources, or
         one set is configured with one SRS resource and another set is configured with three SRS resources; or
   a type of SRS resource set (T=R) having one SRS resource, wherein a number of SRS ports is equal to 1, 2, or 4.

20. The apparatus of claim 16, wherein the at least one antenna switching constraint includes the antenna switching constraint that the UE will not be configured with two or more periodic or semi-persistent SRS resource sets for antenna switching of a same antenna switching type unless the two or more periodic or semi-persistent SRS resource sets have different spatial reception information.

21. The apparatus of claim 20, wherein the same antenna switching type is a type of SRS resource set configured with a higher layer parameter resourceType in SRS-ResourceSet set to 'periodic' or 'semi-persistent' with four SRS resources transmitted in different symbols, each SRS resource consisting of a single SRS port, wherein an SRS port of each resource is associated with a different UE antenna port.

22. An apparatus for wireless communication, comprising:
   means for receiving a configuration message, by a user equipment (UE) from a base station, that configures the UE, according to one or more antenna switching constraints, with multiple sounding reference signal (SRS) resource sets for antenna switching by the UE;
   means for transmitting one or more SRS, by the UE to the base station, according to the configuration of the multiple SRS resource sets; and
   means for transmitting, by the UE to the base station, a capability message indicating the antenna switching constraints, wherein the one or more antenna switching constraints include an antenna switching constraint that the UE will not be configured to transmit SRS resources from multiple SRS resource sets for antenna switching on a same slot.

23. The apparatus of claim 22, wherein the one or more antenna switching constraints include at least one antenna switching constraint selected from the group consisting of:
   the UE will not be configured with multiple SRS resource sets for antenna switching unless all are of a same antenna switching type on a same slot;
   the UE will not be configured with two or more periodic or semi-persistent SRS resource sets for antenna switching of a same antenna switching type on a same slot unless the two or more periodic or semi-persistent SRS resource sets have different spatial reception information; or
   combinations thereof.

24. The apparatus of claim 23, wherein the multiple SRS resource sets configured to the UE have different timing behavior.

25. The apparatus of claim 23, wherein the same antenna switching type is selected from the group consisting of:
- a type of SRS resource set (1T2R) having two SRS resources transmitted in different symbols, each SRS resource consisting of a single SRS port, wherein an SRS port of a second resource of the two SRS resources is associated with a different UE antenna port than another SRS port of a first resource of the two SRS resources;
- a type of SRS resource set (2T4R) having two SRS resources transmitted in different symbols, each SRS resource consisting of two SRS ports, wherein an SRS port pair of a second resource of the two SRS resources is associated with a different UE antenna port pair than another SRS port pair of a first resource of the two SRS resources;
- a type of SRS resource set (periodic or semi-persistent 1T4R) configured with a higher layer parameter resourceType in SRS-ResourceSet set to 'periodic' or 'semi-persistent' with four SRS resources transmitted in different symbols, each SRS resource consisting of a single SRS port, wherein an SRS port of each resource is associated with a different UE antenna port;
- a type of SRS resource set (A-1T4R) in which two SRS resource sets are configured with a higher layer parameter resourceType in SRS-ResourceSet set to 'aperiodic' with a total of four SRS resources transmitted in different symbols of two different slots, wherein:
  - an SRS port of each SRS resource is associated with a different UE antenna port, and
  - at least one of:
    - the two SRS resource sets are each configured with two SRS resources, or
    - one set is configured with one SRS resource and another set is configured with three SRS resources, or
- a type of SRS resource set (T=R) having one SRS resource, wherein a number of SRS ports is equal to 1, 2, or 4.

26. The apparatus of claim 23, wherein the at least one antenna switching constraint includes the antenna switching constraint that the UE will not be configured with two or more periodic or semi-persistent SRS resource sets for antenna switching of a same antenna switching type unless the two or more periodic or semi-persistent SRS resource sets have different spatial reception information.

27. The apparatus of claim 26, wherein the same antenna switching type is a type of SRS resource set configured with a higher layer parameter resourceType in SRS-ResourceSet set to 'periodic' or 'semi-persistent' with four SRS resources transmitted in different symbols, each SRS resource consisting of a single SRS port, wherein an SRS port of each resource is associated with a different UE antenna port.

28. An apparatus for wireless communication, comprising:
- at least one computer processor; and
- at least one memory coupled to the at least one computer processor, wherein the at least one computer processor is configured to:
  - transmit a configuration message, by a base station to a user equipment (UE), that configures the UE, according to one or more antenna switching constraints, with multiple sounding reference signal (SRS) resource sets for antenna switching by the UE;
  - receive one or more SRS, by the base station, transmitted by the UE according to the configuration of the multiple SRS resource sets;
  - receive, by the base station from the UE, a capability message indicating the one or more antenna switching constraints, wherein the one or more antenna switching constraints include an antenna switching constraint that the UE will not be configured to transmit SRS resources from multiple SRS resource sets for antenna switching on a same slot.

29. The apparatus of claim 28, wherein the one or more antenna switching constraints include at least one antenna switching constraint selected from the group consisting of:
- the UE will not be configured with multiple SRS resource sets for antenna switching unless all are of a same antenna switching type on a same slot;
- the UE will not be configured with two or more periodic or semi-persistent SRS resource sets for antenna switching of a same antenna switching type on a same slot unless the two or more periodic or semi-persistent SRS resource sets have different spatial reception information; or
- combinations thereof.

30. The apparatus of claim 29, wherein the at least one antenna switching constraint includes the antenna switching constraint that the UE will not be configured with multiple SRS resource sets for antenna switching unless all of the SRS resource sets are of a same antenna switching type.

31. The apparatus of claim 30, wherein the multiple SRS resource sets configured to the UE have different timing behavior.

32. The apparatus of claim 30, wherein the same antenna switching type is selected from the group consisting of:
- a type of SRS resource set (1T2R) having two SRS resources transmitted in different symbols, each SRS resource consisting of a single SRS port, wherein an SRS port of a second resource of the two SRS resources is associated with a different UE antenna port than another SRS port of a first resource of the two SRS resources;
- a type of SRS resource set (2T4R) having two SRS resources transmitted in different symbols, each SRS resource consisting of two SRS ports, wherein an SRS port pair of a second resource of the two SRS resources is associated with a different UE antenna port pair than another SRS port pair of a first resource of the two SRS resources;
- a type of SRS resource set (periodic or semi-persistent 1T4R) configured with a higher layer parameter resourceType in SRS-ResourceSet set to 'periodic' or 'semi-persistent' with four SRS resources transmitted in different symbols, each SRS resource consisting of a single SRS port, wherein an SRS port of each resource is associated with a different UE antenna port;
- a type of SRS resource set (A-1T4R) in which two SRS resource sets are configured with a higher layer parameter resourceType in SRS-ResourceSet set to 'aperiodic' with a total of four SRS resources transmitted in different symbols of two different slots, wherein:
  - an SRS port of each SRS resource is associated with a different UE antenna port, and
  - at least one of:
    - the two SRS resource sets are each configured with two SRS resources, or
    - one set is configured with one SRS resource and another set is configured with three SRS resources; or
- a type of SRS resource set (T=R) having one SRS resource, wherein a number of SRS ports is equal to 1, 2, or 4.

33. The apparatus of claim 29, wherein the at least one antenna switching constraint includes the antenna switching constraint that the UE will not be configured with two or more periodic or semi-persistent SRS resource sets for antenna switching of a same antenna switching type unless the two or more periodic or semi-persistent SRS resource sets have different spatial reception information.

34. The apparatus of claim 33, wherein the same antenna switching type is a type of SRS resource set configured with a higher layer parameter resourceType in SRS-ResourceSet set to 'periodic' or 'semi-persistent' with four SRS resources transmitted in different symbols, each SRS resource consisting of a single SRS port, wherein an SRS port of each resource is associated with a different UE antenna port.

35. An apparatus for wireless communication, comprising:
at least one computer processor; and
at least one memory coupled to the at least one computer processor, wherein the at least one computer processor is configured to:
receive a configuration message, by a user equipment (UE) from a base station, that configures the UE, according to one or more antenna switching constraints, with multiple sounding reference signal (SRS) resource sets for antenna switching by the UE;
transmit one or more SRS, by the UE to the base station, according to the configuration of the multiple SRS resource sets; and
transmit, by the UE to the base station, a capability message indicating the antenna switching constraints, wherein the one or more antenna switching constraints include an antenna switching constraint that the UE will not be configured to transmit SRS resources from multiple SRS resource sets for antenna switching on a same slot.

36. The apparatus of claim 35, wherein the one or more antenna switching constraints include at least one antenna switching constraint selected from the group consisting of:
the UE will not be configured with multiple SRS resource sets for antenna switching unless all are of a same antenna switching type on a same slot;
the UE will not be configured with two or more periodic or semi-persistent SRS resource sets for antenna switching of a same antenna switching type on a same slot unless the two or more periodic or semi-persistent SRS resource sets have different spatial reception information; or
combinations thereof.

37. The apparatus of claim 36, wherein the at least one antenna switching constraint includes the antenna switching constraint that the UE will not be configured with multiple SRS resource sets for antenna switching unless all of the SRS resource sets are of a same antenna switching type.

38. The apparatus of claim 37, wherein the multiple SRS resource sets configured to the UE have different timing behavior.

39. The apparatus of claim 37, wherein the same antenna switching type is selected from the group consisting of:
a type of SRS resource set (1T2R) having two SRS resources transmitted in different symbols, each SRS resource consisting of a single SRS port, wherein an SRS port of a second resource of the two SRS resources is associated with a different UE antenna port than another SRS port of a first resource of the two SRS resources;
a type of SRS resource set (2T4R) having two SRS resources transmitted in different symbols, each SRS resource consisting of two SRS ports, wherein an SRS port pair of a second resource of the two SRS resources is associated with a different UE antenna port pair than another SRS port pair of a first resource of the two SRS resources;
a type of SRS resource set (periodic or semi-persistent 1T4R) configured with a higher layer parameter resourceType in SRS-ResourceSet set to 'periodic' or 'semi-persistent' with four SRS resources transmitted in different symbols, each SRS resource consisting of a single SRS port, wherein an SRS port of each resource is associated with a different UE antenna port;
a type of SRS resource set (A-1T4R) in which two SRS resource sets are configured with a higher layer parameter resourceType in SRS-ResourceSet set to 'aperiodic' with a total of four SRS resources transmitted in different symbols of two different slots, wherein:
an SRS port of each SRS resource is associated with a different UE antenna port, and
at least one of:
the two SRS resource sets are each configured with two SRS resources, or
one set is configured with one SRS resource and another set is configured with three SRS resources, or
a type of SRS resource set (T=R) having one SRS resource, wherein a number of SRS ports is equal to 1, 2, or 4.

40. The apparatus of claim 36, wherein the at least one antenna switching constraint includes the antenna switching constraint that the UE will not be configured with two or more periodic or semi-persistent SRS resource sets for antenna switching of a same antenna switching type unless the two or more periodic or semi-persistent SRS resource sets have different spatial reception information.

41. The apparatus of claim 40, wherein the same antenna switching type is a type of SRS resource set configured with a higher layer parameter resourceType in SRS-ResourceSet set to 'periodic' or 'semi-persistent' with four SRS resources transmitted in different symbols, each SRS resource consisting of a single SRS port, wherein an SRS port of each resource is associated with a different UE antenna port.

42. A non-transitory computer-readable medium having instructions recorded thereon that, when enacted by one or more computer processors, cause the one or more computer processors to:
transmit a configuration message, by a base station to a user equipment (UE), that configures the UE, according to one or more antenna switching constraints, with multiple sounding reference signal (SRS) resource sets for antenna switching by the UE;
receive one or more SRS, by the base station, transmitted by the UE according to the configuration of the multiple SRS resource sets; and
receive, by the base station from the UE, a capability message indicating the one or more antenna switching constraints, wherein the one or more antenna switching constraints include an antenna switching constraint that the UE will not be configured to transmit SRS resources from multiple SRS resource sets for antenna switching on a same slot.

43. The non-transitory computer-readable medium of claim 42, wherein the one or more antenna switching constraints include at least one antenna switching constraint selected from the group consisting of:

the UE will not be configured with multiple SRS resource sets for antenna switching unless all are of a same antenna switching type on a same slot;

the UE will not be configured with two or more periodic or semi-persistent SRS resource sets for antenna switching of a same antenna switching type on a same slot unless the two or more periodic or semi-persistent SRS resource sets have different spatial reception information; or combinations thereof.

44. The non-transitory computer-readable medium of claim 43, wherein the at least one antenna switching constraint includes the antenna switching constraint that the UE will not be configured with multiple SRS resource sets for antenna switching unless all of the SRS resource sets are of a same antenna switching type.

45. The non-transitory computer-readable medium of claim 44, wherein the multiple SRS resource sets configured to the UE have different timing behavior.

46. The non-transitory computer-readable medium of claim 44, wherein the same antenna switching type is selected from the group consisting of:

a type of SRS resource set (1T2R) having two SRS resources transmitted in different symbols, each SRS resource consisting of a single SRS port, wherein an SRS port of a second resource of the two SRS resources is associated with a different UE antenna port than another SRS port of a first resource of the two SRS resources;

a type of SRS resource set (2T4R) having two SRS resources transmitted in different symbols, each SRS resource consisting of two SRS ports, wherein an SRS port pair of a second resource of the two SRS resources is associated with a different UE antenna port pair than another SRS port pair of a first resource of the two SRS resources;

a type of SRS resource set (periodic or semi-persistent 1T4R) configured with a higher layer parameter resourceType in SRS-ResourceSet set to 'periodic' or 'semi-persistent' with four SRS resources transmitted in different symbols, each SRS resource consisting of a single SRS port, wherein an SRS port of each resource is associated with a different UE antenna port;

a type of SRS resource set (A-1T4R) in which two SRS resource sets are configured with a higher layer parameter resourceType in SRS-ResourceSet set to 'aperiodic' with a total of four SRS resources transmitted in different symbols of two different slots, wherein:

an SRS port of each SRS resource is associated with a different UE antenna port, and at least one of:

the two SRS resource sets are each configured with two SRS resources, or one set is configured with one SRS resource and another set is configured with three SRS resources; or a type of SRS resource set (T=R) having one SRS resource, wherein a number of SRS ports is equal to 1, 2, or 4.

47. The non-transitory computer-readable medium of claim 43, wherein the at least one antenna switching constraint includes the antenna switching constraint that the UE will not be configured with two or more periodic or semi-persistent SRS resource sets for antenna switching of a same antenna switching type unless the two or more periodic or semi-persistent SRS resource sets have different spatial reception information.

48. The non-transitory computer-readable medium of claim 47, wherein the same antenna switching type is a type of SRS resource set configured with a higher layer parameter resourceType in SRS-ResourceSet set to 'periodic' or 'semi-persistent' with four SRS resources transmitted in different symbols, each SRS resource consisting of a single SRS port, wherein an SRS port of each resource is associated with a different UE antenna port.

49. A non-transitory computer-readable medium having instructions recorded thereon that, when enacted by one or more computer processors, cause the one or more computer processors to:

receive a configuration message, by a user equipment (UE) from a base station, that configures the UE, according to one or more antenna switching constraints, with multiple sounding reference signal (SRS) resource sets for antenna switching by the UE;

transmit one or more SRS, by the UE to the base station, according to the configuration of the multiple SRS resource sets; and transmit, by the UE to the base station, a capability message indicating the antenna switching constraints, wherein the one or more antenna switching constraints include an antenna switching constraint that the UE will not be configured to transmit SRS resources from multiple SRS resource sets for antenna switching on a same slot.

50. The non-transitory computer-readable medium of claim 49, wherein the one or more antenna switching constraints include at least one antenna switching constraint selected from the group consisting of:

the UE will not be configured with multiple SRS resource sets for antenna switching unless all are of a same antenna switching type on a same slot;

the UE will not be configured with two or more periodic or semi-persistent SRS resource sets for antenna switching of a same antenna switching type on a same slot unless the two or more periodic or semi-persistent SRS resource sets have different spatial reception information; or combinations thereof.

51. The non-transitory computer-readable medium of claim 50, wherein the at least one antenna switching constraint includes the antenna switching constraint that the UE will not be configured with multiple SRS resource sets for antenna switching unless all of the SRS resource sets are of a same antenna switching type.

52. The non-transitory computer-readable medium of claim 51, wherein the multiple SRS resource sets configured to the UE have different timing behavior.

53. The non-transitory computer-readable medium of claim 51, wherein the same antenna switching type is selected from the group consisting of:

a type of SRS resource set (1T2R) having two SRS resources transmitted in different symbols, each SRS resource consisting of a single SRS port, wherein an SRS port of a second resource of the two SRS resources is associated with a different UE antenna port than another SRS port of a first resource of the two SRS resources;

a type of SRS resource set (2T4R) having two SRS resources transmitted in different symbols, each SRS resource consisting of two SRS ports, wherein an SRS port pair of a second resource of the two SRS resources is associated with a different UE antenna port pair than another SRS port pair of a first resource of the two SRS resources;

a type of SRS resource set (periodic or semi-persistent 1T4R) configured with a higher layer parameter resourceType in SRS-ResourceSet set to 'periodic' or 'semi-persistent' with four SRS resources transmitted in different symbols, each SRS resource consisting of a single SRS port, wherein an SRS port of each resource is associated with a different UE antenna port;

a type of SRS resource set (A-1T4R) in which two SRS resource sets are configured with a higher layer parameter resourceType in SRS-ResourceSet set to 'aperiodic' with a total of four SRS resources transmitted in different symbols of two different slots, wherein:

an SRS port of each SRS resource is associated with a different UE antenna port, and at least one of:

the two SRS resource sets are each configured with two SRS resources, or one set is configured with one SRS resource and another set is configured with three SRS resources, or a type of SRS resource set (T=R) having one SRS resource, wherein a number of SRS ports is equal to 1, 2, or 4.

54. The non-transitory computer-readable medium of claim 50, wherein the at least one antenna switching constraint includes the antenna switching constraint that the UE will not be configured with two or more periodic or semi-persistent SRS resource sets for antenna switching of a same antenna switching type unless the two or more periodic or semi-persistent SRS resource sets have different spatial reception information.

55. The non-transitory computer-readable medium of claim 54, wherein the same antenna switching type is a type of SRS resource set configured with a higher layer parameter resourceType in SRS-ResourceSet set to 'periodic' or 'semi-persistent' with four SRS resources transmitted in different symbols, each SRS resource consisting of a single SRS port, wherein an SRS port of each resource is associated with a different UE antenna port.

* * * * *